(No Model.)
W. KOEGEL & F. STROHACKER.
MILK PAIL.
No. 325,179. Patented Aug. 25, 1885.
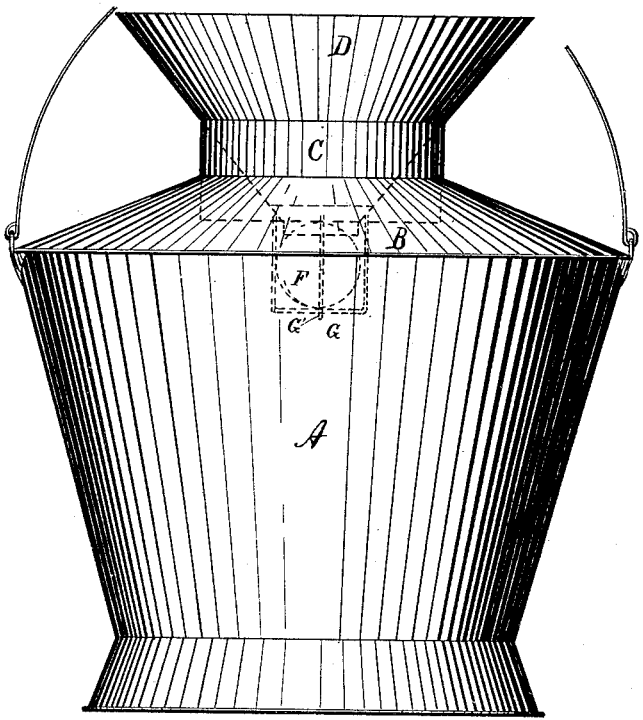
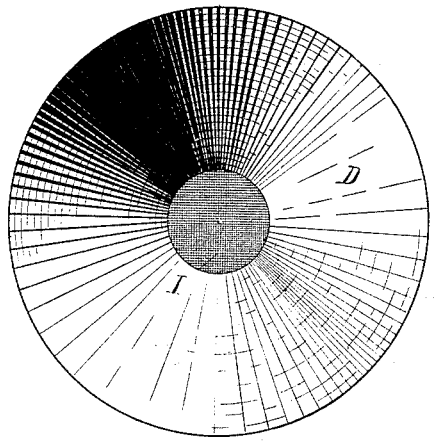
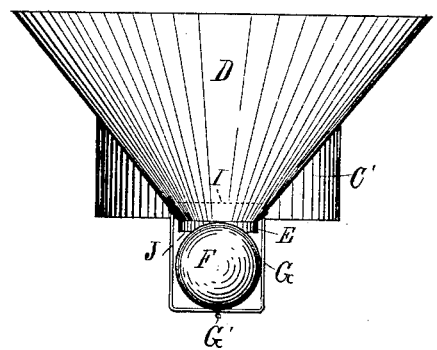
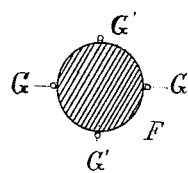
WITNESSES:
G. H. Pattison
W. N. Wilerson
INVENTOR
William Koegel
Frederick Strohacker
by Wiles and Greene
ATTORNEYS

UNITED STATES PATENT OFFICE.

WILLIAM KOEGEL AND FREDERICK STROHACKER, OF FREEPORT, ILLINOIS; SAID STROHACKER ASSIGNOR TO SAID KOEGEL.

MILK-PAIL.

SPECIFICATION forming part of Letters Patent No. 325,179, dated August 25, 1885.

Application filed May 29, 1884. (No model.)

*To all whom it may concern:*

Be it known that we, WILLIAM KOEGEL, a resident of Freeport, in the county of Stephenson and State of Illinois, and FREDERICK STROHACKER, a resident of Freeport, in the county of Stephenson and State of Illinois, have invented certain new and useful Improvements in Milk-Pails; and we do hereby declare the fo'lowing to be a full, clear, and exact description of the invention, such as will enable others skilled in the art to which it pertains to make and use the same.

Our invention relates to improvements in milk-pails, and is fully described, explained, and claimed in the following specification, and shown in the accompanying drawings, in which—

Figure 1 is a side elevation of our improved milk pail, with dotted lines showing internal construction thereof; Fig. 2, a central vertical section of the funnel, strainer, and valve-cage, the ball-valve being shown in elevation; Fig. 3, a plan of the funnel and strainer; and Fig. 4, a horizontal section of the valve and its cage, the plane of section passing through the line $x\ y$, Fig. 2.

In these views, A is a milk-pail of ordinary form, and B a preferably conical cover, soldered or otherwise permanently fastened to the pail. C is a vertical neck or rim concentric with the cover, and soldered thereto at the margin of a central circular opening therein. Within the neck C fits closely a removable tube or cylinder, C', which is soldered to and supports a funnel, D, having the form of an inverted frustum of a cone. The smaller end of the funnel extends downward within and below the collar C', and is provided at the bottom with a short cylindrical tip, E, and the larger portion of the funnel is above the collar C' and neck C, and is of sufficient size for convenience in milking. Near the lower end of the funnel is a sieve, I, of wire-cloth or other suitable material, adapted to strain the milk as it passes from the funnel into the pail below. Beneath the tip E of the funnel is a cage, G G', consisting of two wires, whose ends are soldered or otherwise securely fastened to the outer surface of the funnel, just above the tip. The two wires cross each other at right angles, each of them being bent to form three sides of a rectangle, two of which are vertical and the third horizontal. The two horizontal sides cross at their centers, and the cage thus formed incloses and supports a ball, F, preferably of rubber or other elastic material. (See Figs. 1, 2.) The diameter of the ball and the depth of the cage are such that when the pail is in an upright position, with the ball resting on the bottom of the cage, the ball lies wholly below the conical funnel, and is not in contact at any point with the cylindrical tip E. If the pail be overturned, however, especially when partly filled with milk or other liquid, the ball drops into the opening of the tip E and closes the same, and the pressure of the liquid against the ball holds it firmly in place and prevents the escape of the liquid.

We prefer to make the ball of some elastic material, as it may be readily removed from the cage by compressing it, and at the same time an elastic ball makes a tight joint much more easily than a non-elastic one. It is not essential, however, that it be elastic, and we do not therefore wish to limit our invention to the use of an elastic ball for a valve.

Having, however, described and explained our invention, what we claim as new, and desire to secure by Letters Patent, is—

1. The combination of the pail A, open cover B, having neck C, surrounding the opening therein, the funnel D, collar C', tip E, cage G G', and ball F, all combined and operating substantially as shown and described, and for the purpose set forth.

2. The combination of the pail A, cover B, and neck C, with the funnel D, collar C', strainer I, cage G G', and ball F, all constructed and combined substantially as shown and described, and for the purpose set forth.

In testimony whereof we have signed this specification in the presence of two subscribing witnesses.

WILLIAM KOEGEL.
FREDERICK STROHACKER.

Witnesses:
G. H. PATTISON,
M. H. WILCOXON.